United States Patent [19]

Hills

[11] 3,886,801

[45] June 3, 1975

[54] DECOMPRESSION METER

[75] Inventor: Brian Andrew Hills, Bembridge, England

[73] Assignee: National Research Development Corporation, London, England

[22] Filed: Oct. 30, 1973

[21] Appl. No.: 411,043

[30] Foreign Application Priority Data

Oct. 30, 1972  United Kingdom............... 50003/72

[52] U.S. Cl............. 73/432 R; 73/410; 73/432 SD
[51] Int. Cl............................................. G06g 5/00
[58] Field of Search........................... 73/432 R, 410

[56] References Cited
UNITED STATES PATENTS

| | | | |
|---|---|---|---|
| 3,457,393 | 7/1969 | Stubbs et al................ | 73/432 R UX |
| 3,463,015 | 8/1969 | Gulino et al..................... | 73/432 R |
| 3,757,586 | 9/1973 | Borom.............................. | 73/432 R |
| 3,759,109 | 9/1973 | Johnson et al.................... | 73/432 R |
| 3,777,573 | 12/1973 | Alinari............................. | 73/432 R |

Primary Examiner—Richard C. Queisser
Assistant Examiner—Joseph W. Roskos
Attorney, Agent, or Firm—Fleit & Jacobson

[57]  ABSTRACT

A decompression meter for a diver or a caisson worker to indicate when it is safe to continue decompression during a superatmospheric excursion, comprising means for providing an analogue of the absorption of an inert gas such as nitrogen in solution as tissue around a capillary with varying ambient total pressure and for integrating the rate of absorption and depression with respect to time to indicate when the total volume of gas absorbed will be in excess of a tolerable value beyond which the onset of decompression sickness is likely.

8 Claims, 2 Drawing Figures

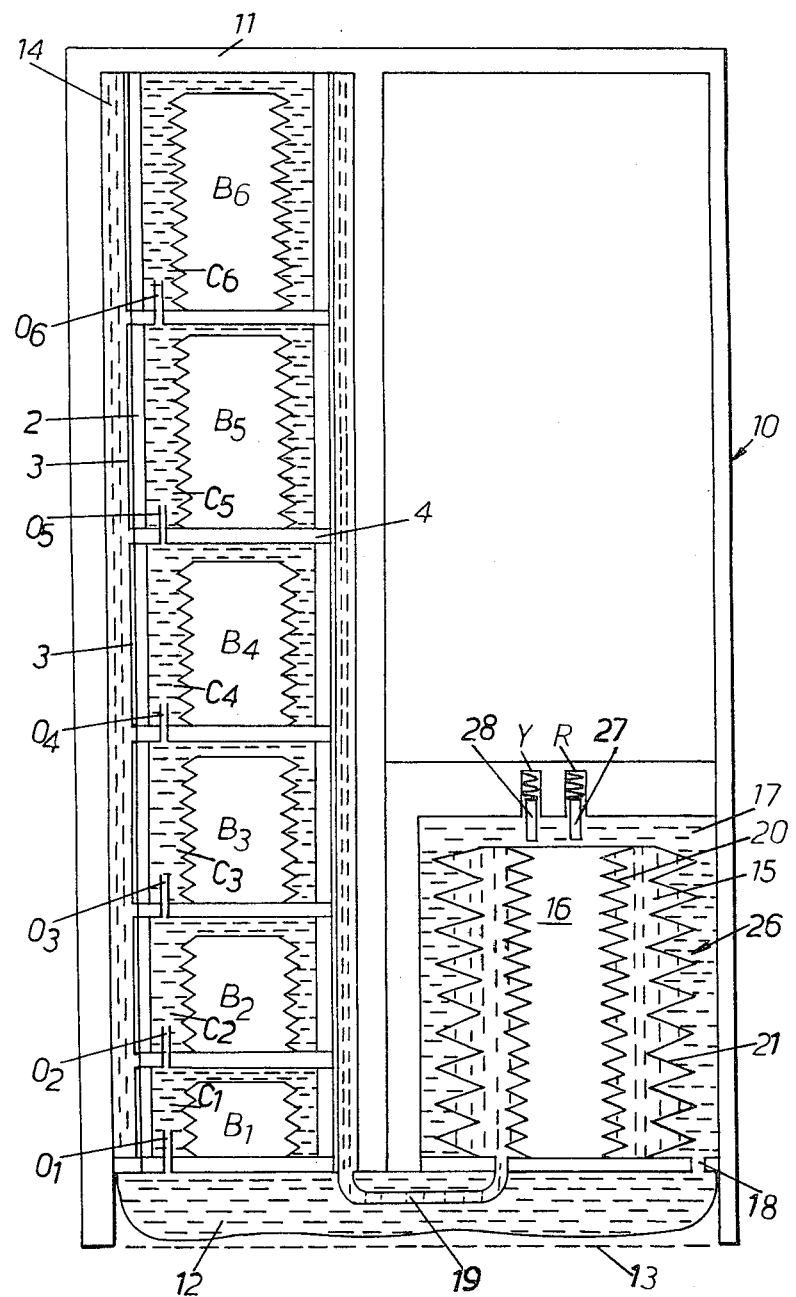

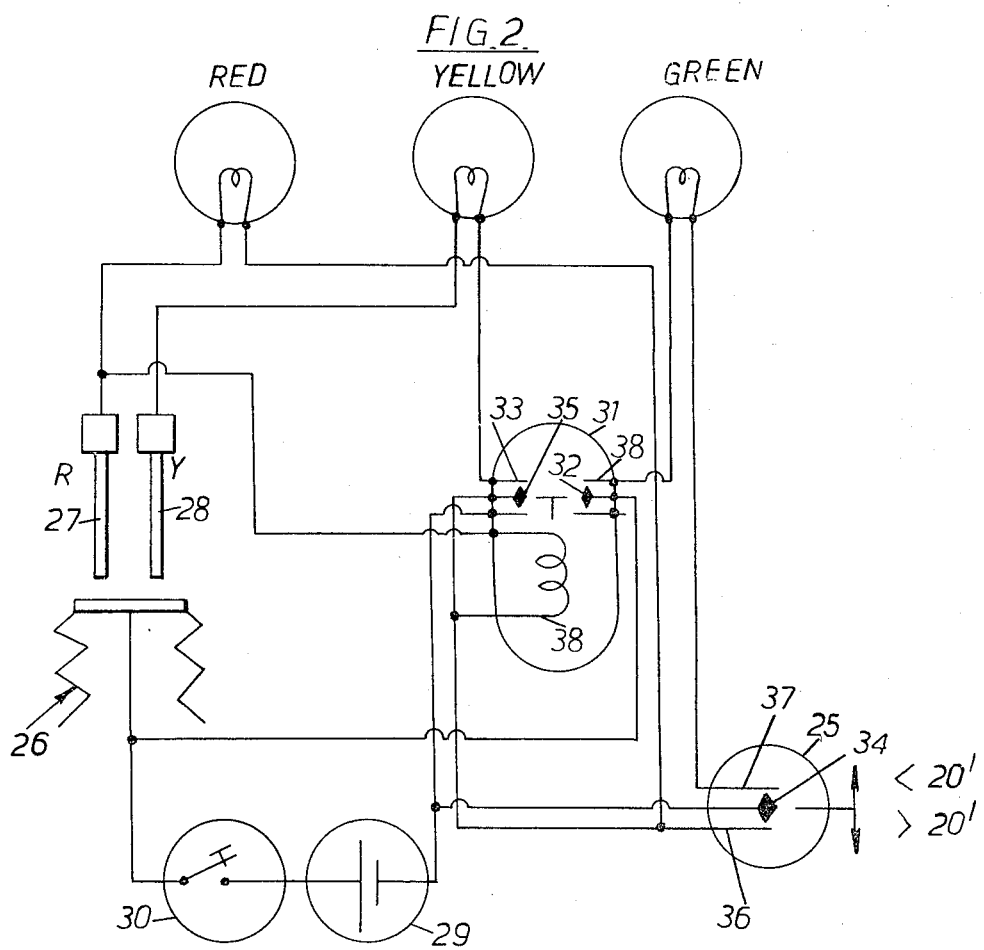

DECOMPRESSION METER

The present invention relates to diving apparatus, and in particular to an indicator for warning a diver of the presence of gas, predominantly an inert gas, such as nitrogen, in the gaseous phase in his body tissue thereby leaving him susceptible to decompression sickness or "bends" upon further decompression.

Traditionally, decompression sickness has been avoided by following the so-called "HALDANE" which assumes that until the onset of bends there is no gaseous nitrogen present in the body tissue at superatmospheric pressures. It has since been shown by experiment that even when the decompression rate is not sufficiently high to provoke pain caused by the phenomenon known as "bends" the gas phase can nevertheless be present in body tissue. Bubbles formed from this gaseous phase are believed to have an additional damaging effect in that their presence can give rise to bone lesions, a disease very common among caisson workers and divers, even those who may not have experienced bends at any time. It is therefore desirable to be able to predict the existence of the gaseous phase in body tissue in order to avoid excessively rapid decompression which will eventually give rise to bends, or in order to signal that at least temporary recompression will be required in order to redissolve the gaseous phase in the tissue.

It is an object of the present invention to provide an instrument for predicting when the history of a superatmospheric excursion has given rise to conditions in which the gaseous phase is likely to be present in body tissue. Such an instrument will be referred to throughout the present specification and claims as a decompression meter.

According to the present invention there is provided a decompression meter including means for generating a first liquid pressure signal representative of the ambient total pressure, means for generating a second liquid pressure signal representative of the local partial pressure of a dissolved gas in capillary blood and hence for stimulating gradual absorption of the gas in solution in body tissue, means responsive to said two liquid pressure signals for sensing when said second signal exceeds said first signal, and means responsive to said excess condition to simulate liberation of dissolved gas as gaseous phase in body tissue and for generating a third signal to indicate the presence of said gaseous phase.

Preferably, the means for stimulating gradual absorption of gas and for generating said second signal may comprise means for stimulating gradual absorption of oxygen and nitrogen in solution in body tissue and for generating a second liquid pressure signal representative of the solution pressure of such dissolved gases, and the means for generating a third signal may be constructed to sense excess of a predetermined fraction of said second signal over the first, said predetermined fraction of the second signal corresponding to the partial pressure of nitrogen in solution in the tissue.

Conveniently, said means for generating a third signal may include an indicator to warn against immediate further decompression.

Suitably said means for generating a third signal may indicate the liberation of gaseous phase upon excess of the second signal or a predetermined component thereof over said first signal, and for integrating said third signal with respect to time to time to provide a measure of the total volume of gaseous phase liberated in the tissue.

It is known that the tissue regions which are most critically affected by absorption of gas are those regions between the various capillary blood vessels. Gas carried by the blood in the capillary vessels diffuses across the wall of the blood vessel and gradually permeates radially outwardly through the neighbouring tissue. Thus each capillary blood vessel can be regarded as influencing a cylindrical region the radius of which is half the spacing between adjacent capillaries. During a superatmospheric excursion the distribution of gas dissolved in the tissue of such a cylindrical region will give rise to variations in the quantity of gas dissolved at different radial stations within such a cylindrical region.

Advantageously therefrom the means for stimulating gradual absorption of gas in body tissue and for generating the second liquid pressure signal comprises means for simulating the gradual absorption of gas at various elemental annuli concentric with a capillary vessel, and the means responsive to said two signals for generating a third signal may comprise means for sensing local excess of said second liquid pressure signal or a component thereof over said first signal in each of the elemental annuli. Desirably, the number of elemental annuli used may be six.

In a particularly suitable form of the present invention the means for simulating gradual absorption of gas in a plurality of elemental annuli may comprise a plurality of individual simulating units connected in series so that said first liquid pressure signal is fed to a first unit of the series to cause in that simulating unit a build-up of pressure which is in turn supplied to the second simulating unit and so on through the series.

Desirably the or each gas absorption simulating unit may consist of a liquid-filled chamber communicated with an input pressure region by means of a calibrated orifice, and may be resiliently expansible to exert increasing resistance to pressure build-up in proportion to the existing pressure build-up, thereby simulating the gradual approach of the concentration of solution in the tissue to a saturation condition.

More desirably, the means for sensing excess of said second signal over said first signal may comprise a porous wall portion to said chamber and covered externally by a liquid impermeable diaphragm subjected on its outer side to a liquid whose pressure is directly proportional to the said first liquid pressure signal. In this way, once the pressure within the or a simulation chamber exceeds the pressure of the liquid in contact with the outer side of the diaphragm, liquid within the chamber is able readily to permeate the porous wall portion to distend the diaphragm outwardly thereby displacing a portion of the liquid disposed outside the diaphragm in order thereby to simulate liberation of some of the dissolved gas in the gaseous phase within the tissue resulting in a drop in the solution concentration in the tissue represented by the simulator in question.

Particularly desirably the pressure of the liquid in contact with the outer side of the or each diaphragm may be in excess of the said first liquid pressure signal and bear a fixed relationship with the said first liquid pressure signal in proportion to the ratio of the total ambient pressure of air to the partial pressure of inert gas in that air. The inert gas may in some instances be helium but will more commonly be nitrogen.

In this latter arrangement the pressure of the liquid on the outer side of the diaphragm may particularly conveniently be derived by a double bellows arrangement in which the ambient total pressure signal is applied to the outside of the bellows and the liquid in contact with the outside of the or each diaphragm is communicated with a portion of the two bellows so as to act on only part of the internal wall surface thereof with the result that the pressure of the liquid within the bellows is greater than the ambient total pressure to which the liquid outside the bellows is subjected.

In order that the present invention may more readily be understood the following description is given, merely by way of example, reference being made to the accompanying drawings, in which:

FIG. 1 is a schematic view of the liquid systems of one embodiment of decompression meter constructed in accordance with the present invention; and FIG. 2 is a circuit diagram showing the electrical indicator unit.

The instrument of the present invention is constructed to operate in accordance with B.A. Hills' so-called "Thermodynamic approach to decompression" as documented in Chapter 14, pages 319 to 340 of "Physiology and Medicine of Diving and Compressed Air Work" edited by Bennett and Elliott published in 1969 by Baillière, Tindall and Cassell. In the analysis there set out it is indicated that during a superatmospheric excursion, once the ambient total pressure reduces to a value which is less than the total partial pressure of all gases present these are liberated into the gaseous phase until their total partial pressure is reduced to the absolute ambient pressure. The volume of nitrogen liberatd locally increases to a threshold value at which pain is experienced giving rise to the phenomenon known as "bends.".

The most critical tissue regions are in the annular regions concentric with individual capillary blood vessels and the distribution of solution concentration in these annular regions can change markedly between compression and decompression and can be distorted by periodic reversal of pressure trend. it is therefore an advantage to be able to simulate the solution concentration conditions in each of a plurality of elemental concentric annuli making up such an annular region influenced by a typical capillary. During compression all the tissue will be subject to the ambient total pressure, the seawater pressure in the case of a diver, or compressed air pressure in the environmental atmosphere experienced by a caisson worker.

These elemental annuli are simulated by individual ones of an array of simulation chambers $C_1$, $C_2$, $C_3$, $C_4$, $C_5$ and $C_6$ shown in FIG. 1 as consisting of a chamber provided with a respective resilient evacuated bellows $B_1$, $B_2$, $B_3$, $B_4$, $B_5$ and $B_6$ and connected to a source of liquid under pressure by means of calibrated orifices $O_1$, $O_2$, $O_3$, $O_4$, $O_5$ and $O_6$, viscosity oil at ambient total pressure and the orifices $O_2$, $O_3$, $O_4$, $O_5$ and $O_6$ linking their respective chambers with the preceding chambers $O_1$, $O_2$, $O_3$, $O_4$ and $O_5$, respectively.

Thus in each simulation chamber the spring bellows simulates progressively increasing resistance to dissolving further gas as the solution concentration increases towards saturation level. Similarly, each orifice simulates the resistance to diffusion of the gas, in this case nitrogen, is a radially outward direction through the various elemental annuli of the capillary environment.

Each chamber has a porous bronze cylindrical wall portion comprising a collar 2 the outer surface of which is completely covered by a cylindrical diaphragm structure 3. As shown in FIG. 1, the individual chambers each comprise a bottom plate 4 with the calibrated orifice formed therein and the porous bronze collars 2 are each clamped between the bottom plate 4 of the respective cylinder and the bottom plate 4 of the next adjacent cylinder thereabove until the chamber $C_6$ is defined by its bottom plate and a wall portion 11 of the instrument casing 10. The diaphragm members 3 are individual to each of the chambers and are clamped between the upper and lower faces of the porous bronze collars 2 and the abutting bottom plates 4, or the wall portion 11 in the case of chamber $C_6$. The diaphragms thus serve additionally as gaskets sealing the individual chambers $C_1$ to $C_6$.

The pressure signal fed to chamber $C_1$ is representative of the ambient total pressure and is derived from a liquid-filled bag 12 confined within a protective grid 13 at one end of the instrument casing 10. Thus, as the ambient atmospheric pressure or the ambient hydrostatic pressure increases the hydrostatic pressure prevailing within the bag 12 increases to cause the pressure in chamber $C_1$ to build up giving rise to both compression of the bellows $B_1$ and commencement of build-up of pressure in chamber $C_2$ by virtue of communication via the orifice $O_2$. In this way, during a continuous pressure increasing phase at the start of a superatmospheric excursion, the pressures in the respective chambers $C_1$, $C_2$, $C_3$, $C_4$, $C_5$ and $C_6$ will increase in that order with the pressure in the first chamber $C_1$ tending to follow the pressure in bag 12 but with considerable time lag caused by the orifice $O_1$. This situation is analogous to the distribution of solution concentrations in each of six concentric elemental annuli the radially innermost of which annuli starts at the capillary wall. That radially innermost annulus has the highest concentration and the radially outermost annulus, tangent with the radially outermost annulus of the next adjacent capillary, has the lowest solution concenteration as represented by the pressure prevailing in chamber $C_6$. For this reason, although the stack of simulating chambers has a constant radius, the length of the chambers varies from the shortest chamber $C_1$ to the longest chamber $C_6$, the length of the various bellows $B_1$ to $B_6$ being proportional to the length of the associated chamber, and the volumes of the chambers being in a distribution equal to the areas of the elemental annuli represented. Alternatively the bellows lengths may be equal and the orifice diameters vary.

The space 14 immediately surrounding the various diaphragms is filled with a liquid having a low viscosity which is substantially constant with changing temperature and this space 14 is in turn communicated with the interior 15 of a double bellows arrangement. The innermost space 16 of the double bellows arrangement is evacuated, or possibly occupied by a gas at a very low pressure, and the space 17 with the bag 12 by way of an opening 18. The coupling conduit 19 between the space 14 and the inter-bellows space 15 is a rigid pipe which does not suffer any noticeable distortion upon increasing ambient total pressures.

The difference in diameter between the inner bellows 20 and the outer bellows 21 of the double bellows mechanism is such that the ratio of the diameter of inner bellows 20 to that of the outer bellows 21 is equal to the ratio of the partial pressure of nitrogen in venous blood to the ambient absolute pressure. This fraction is approximately 0.8 with the result that the ratio of the ambient total pressure to the pressure within the inter-bellows spacing 15 is in the same ratio leaving the pressure in the inter-bellows spacing, and in the spacing 14 immediately surrounding the diaphragm equal to 1.25 times the ambient total pressure.

From the above it is clear that in normal steady state conditions the pressure pushing the diaphragms 3 radially inwardly against the porous bronze collars 2 is 1.25 times the ambient total pressure, and the liquid in each of the chambers $C_1$ to $C_6$ will be at the ambient total pressure, with the result that a pressure differential of at least 0.25 times the ambient total pressure pushes the diaphragm 3 inwardly against the collar 2 and renders each of the chambers $C_1$ to $C_6$ a substantially constant volume system.

During a pressure-increasing phase of a superatmospheric excursion the pressure of the low viscosity liquid in the system 14, 15, 19 increases simultaneously with the ambient total pressure but always multiplied by the constant factor of 1.25. At the same time the pressure in the various chambers $C_1$ to $C_6$ to slowly increasing with the chamber $C_1$ having the highest pressure and the chamber $C_6$ having the lowest of the array of chambers.

If, before the pressure conditions have equalised throughout the array of simulating chambers $C_1$ to $C_6$, the instrument undergoes a pressure-reducing or decompression phase of the superatmospheric excursion, the ambient total pressure in the bag 12 will instantaneously fall and so also will the pressure in the system 14, 15, 19 still multiplied by the factor of 1.25.

Simultaneously the pressure in chamber $C_1$ will begin to decay by dissipation through orifice $O_1$ and the previous prevailing distribution of pressures in the array of chambers $C_1$ to $C_6$ will undergo a reverse tendency so that at some later time the pressure in one of the intermediate chambers, for example chamber $B_4$, will be the highest pressure in the array. If, at that instant, the ambient total pressure is now less than 0.8 times the residual pressure in the chamber $C_4$, the diaphragm 3 surrounding the porous bronze collar 2 of chamber $C_4$ will distend outwardly displacing some of the low viscosity liquid from the space 14 to the space 15. The low flow resistance across the porous bronze collar 2 of chamber $C_4$ and the low resistance to distension of the diaphragm 3 enables this displacement to proceed freely with little or no resistance. As the bellows 20, 21 just start to extend, a limit switch "Y" is tripped causing an indication that a very small volume of the gaseous phase is likely to be present in the tissue of a body which has undergone the same excursion history as the instrument 10. From the point of view of avoiding decompression sickness of "bends" it will still be safe for the body and the instrument to be allowed to continue decompression provided this volume remains negligible as the dissolved air in the body tissue continuously permeates back into the blood stream to be exhaled from the lungs as will be simulated by the gradual decay of the residual pressures in the simulating chambers.

If, after the initial actuation of the limit switch 37 Y," further decompression is postponed, the gradual decay of pressure in the simulation chambers will proceed until the inequality of the pressures across the diaphragm 3 surrounding chamber $C_4$ is restored and the diaphragm contracts against the outer wall of the porous bronze collar 2. This would of course allow contraction of the double bellows assembly 20, 21 and deactivation of the limit switch "Y."

If, on the other hand, decompression were to have continued at a rate which would be too fast for the rate of decay of pressure in chamber $C_4$ to match the rate of decrease of the ambient total pressure, the diaphragm 3 surrounding chamber $C_4$ would have been caused to distend further and possibly the diaphragm around chambers $C_3$ and $C_5$ may similarly have been caused to undergo initial distension with the result that even more of the liquid in the space 14 is displaced into the inter-bellows spacing 15 to cause the double bellows mechanism 20, 21 to extend sufficiently for the second limit switch "R" to be actuated. This would signify that the total quantity of gaseous phase present around each capillary is greater than would be consistent with optimal decompression yet still not enough to cause "bends."

FIG. 2 shows the circuit arrangement for the main embodiment of the decompression meter. The indication to the operator is in the form of three lights in a traffic light arrangement, namely a red light controlled by the limit switch "R" shown in FIG. 1, a yellow light controlled by the limit switch "Y" shown in FIG. 1, and a green light controlled by a mechanical flip-flop pressure switch which trips upon passing through a predetermined pressure of the order of 20 to 25 feet of water (gauge) from which pressure the particular individual is known to be able to make an immediate return to atmospheric pressure without suffering "bends." This pressure value in feet of water (gauge) is referred to later as the "critical surfacing depth." This pressure switch 25 is shown in FIG. 2. The bellows assembly 20, 21 is shown schematically at 26 in FIG. 2 and the "R" and "Y" limit switches are shown at 27 and 28, respectively.

The circuit is energized by a battery 29 and has an on/off switch 30 in order to isolate the battery when the instrument is not in use. A two-pole double throw switch 31 serves to control the operation of the green light.

The bellows 26 and the rocker 32 at one side of the two pole switch 31 are both connected to the positive connection of the battery by way of the on/off switch 30. Thus as the bellows 26 expands to strike the contact of the "Y" limit switch 28 the battery will be connected via the bellows and the yellow lamp to one of the fixed contacts at the left hand side of the two pole switch 31. However the circuit will only be completed if the rocker 34 of the pressure switch 25 engages the lower fixed contact 36 since this contact 36 is connected to the left hand rocker 35 of the two pole switch and the rocker 34 of the pressure switch is connected to the negative side of the battery 29. This condition of the pressure switch 25 is satisfied when the gauge pressure is greater than 20 feet of water.

If the bellows 26 has made contact to operate the switch 28 while the pressure switch 25 senses a gauge pressure of less than the critical surfacing depth (20 to 25 feet), the rocker 34 will be in engagement with the upper fixed contact 37 and the circuit via the yellow lamp will not be made.

If the bellows 26 rises further to operate the "R" limit switch 27, the red lamp will be connected through the energising coil 36 of the two pole double throw switch 31, to the battery negative pole provided the rocker 34 of the pressure switch 25 is in engagement with the lower fixed contact 36 to complete the circuit back to the negative pole of the battery via the rocker 34. The circuit via the red lamp is completed by way of the lower fixed contact 36 of the pressure switch 25, to cause the red lamp to light when the rocker 34 has dropped to indicate a pressure greater than 20 feet of water. The effect of current flowing in the coil 38 of the double-throw switch 31 is to hold the rockers 32 and 35 down to isolate the yellow and green lights for reasons to be explained later.

When the pressure switch 25 senses a reduction of pressure below the 20 foot threshold value, the rocker 34 rises to contact the upper fixed contact 37 and isolates the holding coil 38 of the switch 31 to allow the rockers 32 and 35 to rise into engagement with the respective upper fixed contacts 33 and 38. This has the effect of communicating the right hand rocker 32 of the two pole switch, at battery positive potential, with the upper fixed contact 38 to energise the green light which is then connected to the negative side of the battery 29 by way of the rocker 34 and upper fixed contact 37 of the pressure switch 25. Simultaneously, the yellow light is de-energised because the "break" condition between rocker 34 and lower fixed contact 36 of the pressure switch 25 isolates the yellow light from the battery.

From the circuit illustrated in FIG. 2, it will be clear that only when the "R" limit switch 27 is operated can the red light glow and the holding coil 38 pull down the switch rockers 32 and 35 to isolate the yellow light and the green light. As all other times the holding coil 38 is de-energised allowing the yellow light to be actuated by operation of the "Y" switch 28 and the green light to be operated under the control of the pressure switch 25.

With the new decompression techniques proposed in "Physiology and Medicine of Diving and Compressed Air Work" referred to above it is proposed that the initial part of a decompression phase be carried out smoothly but gradually in order to avoid any significant liberation of the dissolved nitrogen in the gaseous phase. From a depth of 20 to 25 feet attained in this controlled manner it is possible for an immediate return to the surface to be carried out. For this reason the green light on the control panel of the decompression meter will illuminate at the critical surfacing depth (20 to 25 feet) provided the red light is not itself illuminated. Thus the diver or caisson worker using the instrument will be free to return immediately by normal atmospheric pressure once the green light has illuminated since the green light cannot glow while the red light is indicating excessive gaseous phase in the tissue.

From the above description of the construction and operation of the device 10 it will be clear that the dimensions of the orifices $O_1$ to $O_6$, the spring rates and dimensions of the bellows $B_1$ and $B_6$, and the dimensions and spring rates of the double bellows arrangement 20, 21 are all critical and are representative of the various variable factors governing the mechanism of dissolving air in body tissue. These various characteristics can of course be computed to provide an accurate analogue of the activity within the elemental annuli making up a typical cylinder of influence around each capillary blood vessel.

Since the liquid in the system 14, 15, 19 is intended to provide an accurate analogue of the variation of ambient total pressure and to simulate conversion of nitrogen and other gases into the gaseous phase in body tissue it is preferably but not essentially given a low viscosity which does not vary to an appreciable extent to the varying temperature.

On the other hand, the liquid within the various simulation chambers $C_1$ to $C_6$ is of higher viscosity and is preferably a silicone oil with a viscosity which is substantially constant with varying temperature.

In order to avoid nitrogen narcosis and reduce the incidence of "bends" several commercial deep diving operators employ a mixture of oxygen and helium in a suitable ratio such that the helium acts as inert gas in place of the nitrogen of atmospheric air. The decompression meter described can readily be adapted to predict the body tissue conditions when helium is employed, merely by using an alternative series of simulation chambers $C_1$ to $C_6$ which simulate lower solubility in tissue yet a faster diffusion rate to reflect the fact that helium diffuses through body tissue faster than does nitrogen. Where helium and nitrogen are employed together in the same dive it is possible for a simple changeover switch to be employed to alternate between the "nitrogen component" bellows and the "helium component" bellows.

Some diving equipment, for example, the equipment known by the trade name ELECTROLUNG employs a constant partial pressure of oxygen in the inspired gas mixture which will cause a variation with pressure in the composition of the nitrogen or helium making up the remainder of the breathing mixture. In order to preserve accuracy in operation using this particular modified form of life support system the bag 12 will be replaced by a liquid-filled chamber which includes a simple single bellows mechanism mechanically connected to an electric servo-motor. The servo-motor is in turn connected in the same circuit as the electrolung sensing electrode which controls the partial pressure of the oxygen inspired. The motor may for example be connected to the bellows by means of a threaded shaft which is rotated by the motor and engages the bellows to pull the bellows in a direction reducing the pressure of fluid fed to the first simulation chamber $C_1$ as the signal from the sensing electrode indicates a need for an increased partial pressure of oxygen inspired. This pulling on the bellows will have the effect of simulating a drop in nitrogen or helium in venous blood. In this same alternative embodiment the double bellows 20, 21 is replaced by a bag similar to the sensing bag 12 of the main embodiment. The assembly of chambers $C_1$ to $C_6$ with their orifices $O_1$ to $O_6$ and the bellows $B_1$ to $B_6$ remain the same. These modifications have the effect of reducing the pressure in the simulation chambers below ambient pressure rather than of elevating the external pressure in space 14 above ambient to compensate for the inherent unsaturation in tissue.

The above described decompression meter has several advantages over any known form of control of decompression.

The main advantage is that, by keeping just on the point of separation of the gas phase from solution, one can decompress in less total time or more safely than with the decompression programme prescribed by conventional diving tables or any decompression meter based upon them. The meter predicts the formation, extent and location of the gaseous phase formed within a body tissue in order to signal the need for action to avoid the "bends" during subsequent decompression. Secondly it is particularly useful that this information can be instantaneously translated to give an immediate indication to the diver of his exposure to a pressure less than the instantaneous minimum consistent with an optimal decompression programme which, taking into account the excursion history will bring him to the surface of the minimum time or with the maximum margin for safety. The meter also indicates the extent of recompression, and subsequent optimal decompression in the event that the diver has been unable to comply with earlier signals. Because the quantity of liquid displaced from the space 14 into the inter-bellows spacing 15 provides an indication of the total amount of gaseous phase present in the elemental annuli surrounding each capillary the instrument "memory" can allow for the consequent fall diffusion gradient if the diver or caisson worker using the instrument has suffered temporary loss of mental faculties due to nitrogen narcosis and ignored the danger signal. Immediately the operator recovers he can place complete faith in the instrument to continue indicating optimal decompression despite his lapse.

Furthermore, by using the "traffic light" presentation it is readily possible for a supervisor, upon seeing a caisson worker or diver return to normal atmospheric pressure with the red light showing, as a result of several possible reasons causing the operator to overlook the red light, to ensure that the operator is immediately recompressed.

The simple red, yellow and green light mechanism is readily visible to the operator in the murkiest of conditions and any one of the lights may readily be replaced by or supplemented by a suitable audible warning.

Moreover, whereas traditionally the operation of a decompression meter involves study of depth tables to interpolate the reading, the presently proposed meter provides an immediate indication to the operator as to whether or not his excursion history leaves him currently in danger of undergoing "bends" on further decompression.

I claim:

1. A decompression meter as hereinbefore defined, comprising:
   a. first means responsive to the ambient total pressure for generating a first liquid pressure signal;
   b. second means responsive to the ambient total pressure for generating a varying second liquid pressure signal which represents the solution pressure of oxygen and nitrogen in body tissue and has a value representative of the local partial pressure of a dissolved gas in capillary blood and a rate of change proportional to said ambient total pressure for simulating gradual absorption of a gas in solution in body tissue, said second means comprising analogue means for simulating gradual absorption of oxygen and nitrogen in solution in body tissue at various radially successive concentric annuli of body tissue around a capillary blood vessel;
   c. third means responsive to said first and second liquid pressure signals for sensing in the analogue of each of said annuli a condition of excess of the value of said second signal over the value of said first signal; and
   d. fourth means responsive to said excess condition to simulate liberation of a dissolved gas as gaseous phase in body tissue and for generating a third signal to indicate the presence of said gaseous phase, said fourth means being constructed to sense excess over said first signal of a predetermined fraction of the second signal which fraction corresponds to the partial pressure of nitrogen in solution in the body tissue as a fraction of the total solution pressure of oxygen and nitrogen in the tissue;
   e. said third means being adapted to sense local excess of said predetermined fraction of said second liquid pressure signal in the analogue of each of said radially successive annuli over said first signal.

2. A decompression meter as set forth in claim 1, wherein said means for generating a third signal includes indicator means to warn against immediate further decompression.

3. A decompression meter as set forth in claim 1, wherein said third signal indicates the liberation of gaseous phase upon excess of said predetermined fraction of the second signal over said first signal, and said fourth means integrates said third signal with respect to time to provide a measure of the total volume of gaseous phase liberated in the tissue.

4. A decompression meter as set forth in claim 1 wherein said radially successive annuli have equal radial depths and said means for simulating gradual absorption of gas in a plurality of radially successive annuli of body tissue around a blood vessel comprise a plurality of individual simulating units connected in series so that said first liquid pressure signal is fed to a first unit of the series to cause in that simulating unit a build-up of pressure which is in turn supplied to the second simulating unit, and each successive simulating unit is fed with a signal responsive to the pressure built up in a preceding unit.

5. A decompression meter as set forth in claim 4, wherein each gas absorption simulating unit consists of a liquid-filled chamber, a calibrated orifice to said chamber, and resiliently deformable means for allowing increase of the liquid volume in said chamber with increasing resistance to pressure build-up in proportion to the existing pressure build-up, thereby simulating the gradual approach of the concentration of solution in the tissue to a saturation condition.

6. A decompression meter as set forth in claim 5, wherein said third means comprises a porous wall portion to said chamber; a liquid impermeable diaphragm covering said chamber wall portion externally, and means subjecting the exterior of said diaphragm to a liquid whose pressure is directly proportional to the said first liquid signal.

7. A decompression meter as set forth in claim 6, wherein the pressure of the liquid in contact with the outer side of each diaphragm is in excess of the said first liquid pressure signal and bears a fixed relationship with the first liquid pressure signal in proportion to the ratio of the total ambient pressure of air to the partial pressure of inert gas in that air.

8. A decompression meter as set forth in claim 7, and including double bellows having first and second parts, means applying the ambient total pressure signal to the outside of said first and second parts of the bellows, means applying the liquid in contact with the outside of each diaphragm to only said first part of the internal wall surface of the bellows with the result that the pressure of the liquid within the bellows is greater than the ambient total pressure to which the liquid outside the bellows is subjected.

* * * * *